United States Patent
Hashmi et al.

(10) Patent No.: US 12,261,765 B1
(45) Date of Patent: Mar. 25, 2025

(54) SYSTEM AND METHOD TO PERFORM AUTOMATED STEERING OF NETWORK TRAFFIC OVER A LEAST LATENCY PATH

(71) Applicant: Morgan Stanley Services Group Inc., New York, NY (US)

(72) Inventors: Faisal Hashmi, Richmond, TX (US); Aundra Browning, Fuquay Varina, NC (US); Amit Khanna, Edison, NJ (US); Barnabás Erdei, Budapest (HU); Sangeetha V. Nair, Karnataka (IN)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 18/929,937

(22) Filed: Oct. 29, 2024

(51) Int. Cl.
*H04L 45/121* (2022.01)
*H04L 45/00* (2022.01)
*H04L 45/125* (2022.01)

(52) U.S. Cl.
CPC .......... *H04L 45/121* (2013.01); *H04L 45/125* (2013.01); *H04L 45/70* (2013.01)

(58) Field of Classification Search
CPC ...... H04L 45/121; H04L 45/125; H04L 45/70
USPC ....................................................... 709/238
See application file for complete search history.

(56) References Cited

U.S. PATENT DOCUMENTS

| | | | |
|---|---|---|---|
| 7,844,729 | B1 | 11/2010 | Friedman et al. |
| 7,859,993 | B1 | 12/2010 | Choudhury et al. |
| 11,233,719 | B1 | 1/2022 | Pandey et al. |
| 11,689,445 | B2 | 6/2023 | Nagarajan et al. |
| 11,706,124 | B2 | 7/2023 | Nagarajan et al. |
| 2003/0088671 | A1 | 5/2003 | Klinker et al. |
| 2006/0050736 | A1 | 3/2006 | Segal |
| 2008/0069138 | A1 | 3/2008 | Acharya et al. |
| 2012/0163180 | A1 | 6/2012 | Goel |
| 2015/0244617 | A1* | 8/2015 | Nakil ................. H04L 41/0631 709/224 |
| 2021/0099391 | A1* | 4/2021 | Masputra ............. H04L 47/805 |
| 2022/0060448 | A1* | 2/2022 | White ................. H04L 63/1441 |
| 2022/0200892 | A1* | 6/2022 | Pandey ................ H04L 45/121 |

* cited by examiner

*Primary Examiner* — Hermon Asres
(74) *Attorney, Agent, or Firm* — Leason Ellis LLP (57) ABSTRACT

A system and method perform automated steering of network traffic over a least latency path. A service request module receives traffic parameters from a user, a process train module generates a service identification (ID) in response to a request from the service request module, and a connection admission control module generates a service ticket including the service ID and the traffic parameters, communicates with a network controller to gather information about a network, determines the least latency path through the network from the gathered information, and generates a command in the service ticket. Activation of the command configures the network to steer the traffic flow of communications of the user on the least latency path. The method implements the system.

19 Claims, 6 Drawing Sheets

JIRA UPDATE
- JIRA TICKET # X
- Service ID
- Flow Source/Destination IP/Ports
- Flow Bandwidth

- Blue Plain Head End <names> and Blue Tail End PE <names>
    - Tunnel Path Hopes and interfaces traversed
    - Tunnel Path Bandwidth Issues: Identify router and interface failing the BW load test, show comparing numbers.
- Blue Plain Head End <names> and Red Tail End PE <names>
    - Tunnel Path Hopes and interfaces traversed
    - Tunnel Path Bandwidth Issues: Identify router and interface failing the BW load test, show comparing numbers.
- Red Plain Head End and Red Tail End PE
    - Tunnel Path Hopes and interfaces traversed
    - Tunnel Path Bandwidth Issues: Identify router and interface failing the BW load test, show comparing numbers.
- Red Plain Head End and Blue Tail End PE
    - Tunnel Path Hopes and interfaces traversed
    - Tunnel Path Bandwidth Issues: Identify router and interface failing the BW load test, show comparing numbers.
- Backup Tunnel Path Bandwidth Issues: Identify router and interface failing the BW load test, show comparing numbers.

---

- Reverse Blue Plain Head End <names> and Blue Tail End PE <names>
    - Tunnel Path Hopes and interfaces traversed
    - Tunnel Path Bandwidth Issues: Identify router and interface failing the BW load test, show comparing numbers.

---

Access

Blue Head End PE
- Interface on which traffic steering policy will be applied
    - Access type: Branch
    - Branch Router name
    - Latency: RTT Latency msec
    - Least Latency Access: YES Reverse-Blue Head End PE
- Interface traffic steering policy will be applied
    - Access type: ASBR Red Head End PE
- Interface traffic steering policy will be applied
    - Access type: Branch
    - Branch Router name
    - If branch: RTT Latency msec
    - Least Latency Access: NO Reverse-Red Head End PE
- Interface traffic steering policy will be applied
    - Access type: ASBR

SYSTEM AND METHOD TO PERFORM AUTOMATED STEERING OF NETWORK TRAFFIC OVER A LEAST LATENCY PATH

FIELD OF THE DISCLOSURE

The present disclosure relates generally to network traffic control, and, more particularly, to a system and method which perform automated steering of network traffic over a least latency path.

BACKGROUND OF THE DISCLOSURE

During management of a network of an organization, the demands of bandwidth and capacity to accommodate users is an ongoing issue. Introducing new subscribed flows for the low latency transport in the network without checking existing and historical utilization can introduce a bandwidth oversubscription scenario when bandwidth usage peaks at a particular time. Such bandwidth oversubscription can cause packets drops and degradation of service for all users. However, merely checking utilization at the time of deployment is not a comprehensive test as network utilization peaks at different times depending of time of day.

SUMMARY OF THE DISCLOSURE

According to an implementation consistent with the present disclosure, a system and method perform automated steering of network traffic over a least latency path.

In an implementation, a least latency path delivery system is configured to identify a least latency path of traffic flow in a network. The least latency path delivery system comprises a hardware-based processor; a memory, and a set of modules. The memory is configured to store instructions and configured to provide the instructions to the hardware-based processor. The set of modules is configured to implement the instructions provided to the hardware-based processor. The set of modules includes a service request module, a process train module, and a connection admission control (CAC) module. The service request module is configured to receive traffic parameters from a user. The process train module is configured to generate a service identification (ID) in response to a request from the service request module. The CAC module is configured to generate a service ticket including the service ID and the traffic parameters, to communicate with a network controller operatively connected to the network to gather path information about the least latency path through the network, and to generate a command in the service ticket. Activation of the command configures the network to steer the traffic flow of communications of the user on the least latency path.

The traffic parameters can be selected from the group consisting of: a source host Internet Protocol (IP) address, a destination host IP address, a first port associated with the source host IP address or a second port associated with the destination host IP address, and projected bandwidth of the traffic flow. The CAC module can determine whether a sum of the projected bandwidth and a historical maximum bandwidth utilization on the least latency path is greater than a predetermined bandwidth usage threshold. The least latency path delivery system can include an output device, and in the case that the sum of the projected bandwidth and the historical maximum bandwidth utilization on the least latency path is greater than the predetermined bandwidth usage threshold, the CAC module can generate and output, through the output device, a notification of the predetermined bandwidth usage threshold being exceeded. Alternatively, in the case that the sum of the projected bandwidth and the historical maximum bandwidth utilization on the least latency path is not greater than the predetermined bandwidth usage threshold, the CAC module can determine the least latency path from the gathered path information, and can generate the command.

The least latency path delivery system can further comprise an input/output device, wherein the process train module, responsive to the request, is triggered to prompt the CAC module to generate a service ticket, to associate the service ticket with the service ID, and to automatically map an organizational network change process to generate an organizational network change process map, wherein the CAC module automatically furnishes required information that is needed to steer the traffic on the least latency path, wherein the required information includes the command having a uniform resource locator (URL) link, wherein the command is not executable until the service ticket reaches a predetermined appropriate level of validation status, wherein, as the process train module operates in accordance with the organizational network change process map, the process train module automatically sends a notification to a team member, through the input/output device, requesting a validation of the information in the service ticket, and wherein the process train module, responsive to receiving the validation from the team member through the input/output device, generates status information associated with the status of the service ticket, with the status information depicting a validation process stage.

The CAC module can communicate with a network route parser system operatively connected to the network to gather network route parser information about the network, and can determine the least latency path from the gathered network route parser information. The CAC module can communicate with a network performance management system operatively connected to the network to gather historical information about the historical maximum bandwidth utilization.

In another implementation, a system is configured to identify a least latency path of traffic flow in a network. The system comprises a network controller operatively connected to the network, a network route parser system operatively connected to the network, a network performance management system operatively connected to the network, and a least latency path delivery system. The least latency path delivery system includes a hardware-based processor, a memory, and a set of modules. The memory is configured to store instructions and configured to provide the instructions to the hardware-based processor. The set of modules is configured to implement the instructions provided to the hardware-based processor. The set of modules includes a service request module, a process train module, and connection admission control (CAC) module. The service request module is configured to receive traffic parameters from a user. A process train module is configured to generate a service identification (ID) in response to a request from the service request module. The CAC module is configured to generate a service ticket including the service ID and the traffic parameters, to communicate with the network controller, the network route parser system, and the network performance management system to gather information about the network, to determine the least latency path from the gathered information, and to generate a command in the service ticket. Activation of the command configures the network to steer the traffic flow of communications of the user on the least latency path.

The traffic parameters can be selected from the group consisting of: a source host Internet Protocol (IP) address, a destination host IP address, a first port associated with the source host IP address or a second port associated with the destination host IP address, and projected bandwidth of the traffic flow. The CAC module can determine whether a sum of the projected bandwidth and a historical maximum bandwidth utilization on the least latency path is greater than a predetermined bandwidth usage threshold. The least latency path delivery system can include an output device, and in the case that the sum of the projected bandwidth and the historical maximum bandwidth utilization on the least latency path is greater than the predetermined bandwidth usage threshold, the CAC module can generate and output, through the output device, a notification of the predetermined bandwidth usage threshold being exceeded. Alternatively, in the case that the sum of the projected bandwidth and the historical maximum bandwidth utilization on the least latency path is not greater than the predetermined bandwidth usage threshold, the CAC module can determine the least latency path from the gathered path information, and can generate the command. The command can be a uniform resource locator (URL) link.

In a further implementation, a computer-based method comprises receiving traffic parameters from a user to access a network, sending a request from a service request module to a process train module, generating, by the process train module, a service identification (ID) in response to request, transmitting the traffic parameters and the service ID to a connection admission control (CAC) module, generating a service ticket including the service ID and the traffic parameters, communicating with a network controller operatively connected to the network, gathering path information about a least latency path through the network from the network controller, determining the least latency path of communications from the user through the network from the gathered path information, generating a command in the service ticket, and activating the command to configure the network to steer traffic flow of communications of the user on the least latency path.

The traffic parameters can be selected from the group consisting of: a source host Internet Protocol (IP) address, a destination host IP address, a first port associated with the source host IP address or a second port associated with the destination host IP address, and projected bandwidth of the traffic flow. The method can further comprise determining whether the projected bandwidth is greater than a predetermined bandwidth usage threshold. In the case that the projected bandwidth is greater than the predetermined bandwidth usage threshold, the method can generate and output, through an output device, a notification of the predetermined bandwidth usage threshold being exceeded, and in the case that the projected bandwidth is not greater than the predetermined bandwidth usage threshold, the method can determine the least latency path from the gathered information, and generates the command.

The command can be a uniform resource locator (URL) link, and activating the command can includes actuating the URL link. The method can further comprise gathering network route parser information about the network from a network route parser system, and gathering historical information about the network from a network performance management system, wherein determining the least latency path can include using the gathered network route parser information and the gathered historical information. A process train module initiates a process train that provides human validation of the information as the information moves through an organizational network change process. A status of a service ticket depicts the validation process stages. Once a validation process is completed, the CAC module generates a command on the service ticket, and the command is executed. The requested traffic is then steered over the least latency path.

Any combinations of the various embodiments, implementations, and examples disclosed herein can be used in a further implementation, consistent with the disclosure. These and other aspects and features can be appreciated from the following description of certain implementations presented herein in accordance with the disclosure and the accompanying drawings and claims.

BRIEF DESCRIPTION OF THE DRAWINGS

FIG. 4 is an example ticket generated by the system of FIG. 1.

It is noted that the drawings are illustrative and are not necessarily to scale.

DETAILED DESCRIPTION OF CERTAIN EMBODIMENTS OF THE DISCLOSURE

Example embodiments and implementations consistent with the teachings included in the present disclosure are directed to a system 100 and method 500 which perform automated steering of network traffic over a least latency path.

Figure 1:
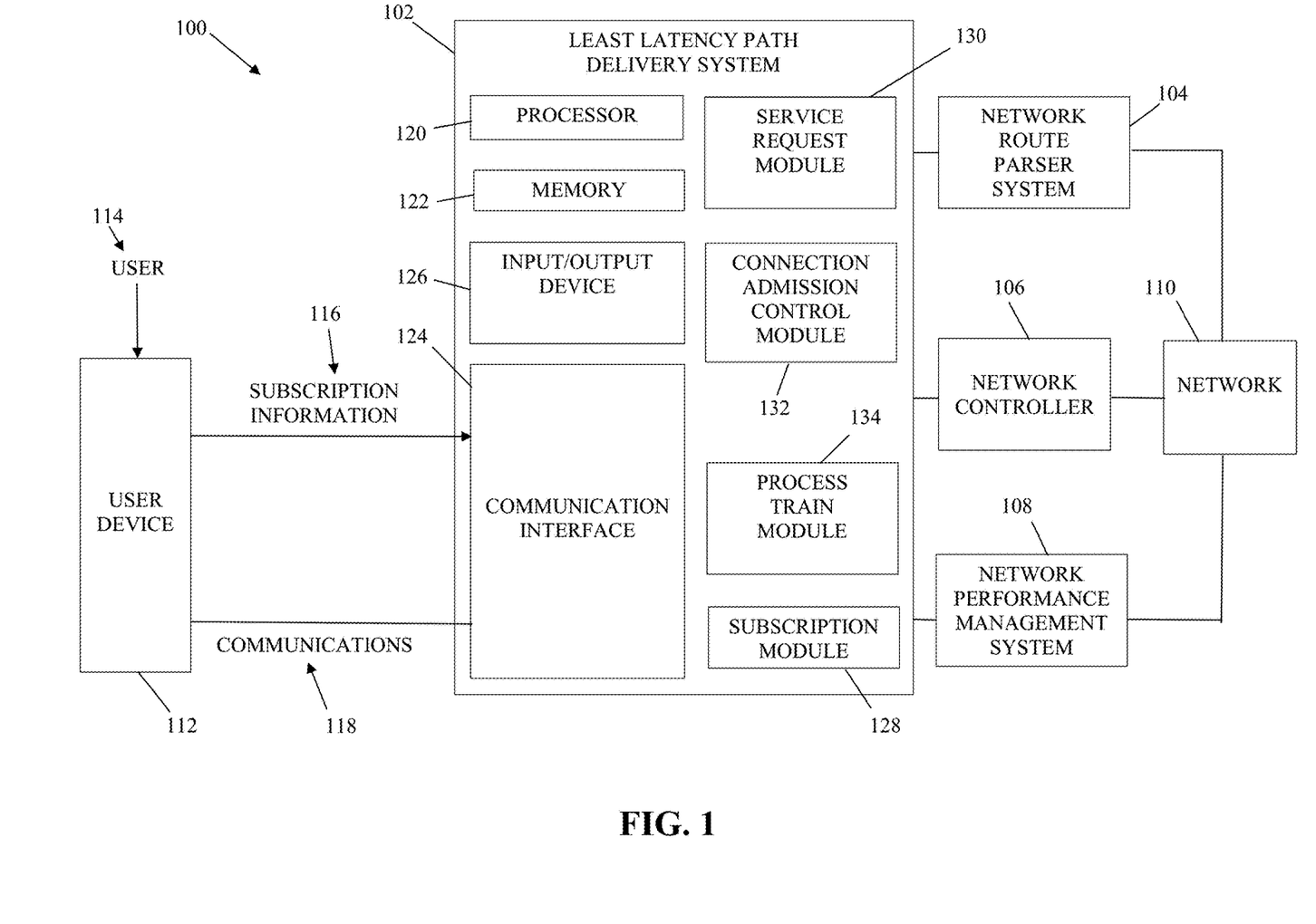
FIG. 1 is a schematic of a system, according to an implementation.

Referring to FIG. 1, in an implementation consistent with the invention, the system 100 includes a least latency path delivery system 102 operatively connected to a network route parser system 104, a network controller 106, and a network performance management system 108. Each of the network route parser system 104, the network controller 106, and the network performance management system 108 are connected to a core network 110. In one implementation, the network route parser system 104 includes network tools configured to access the core network 110, routing tables, and interface Internet Protocol (IP) lookup tools. In one implementation, the network controller 106 includes a CROSSWORKS system publicly available from CISCO SYSTEMS, INC., such as a CROSSWORKS OPTIMIZATION ENGINE and a CROSSWORKS playbook. In one implementation, a network performance management system 108 includes a SEVONE NETWORK PERFORMANCE MANAGEMENT (NPM) system publicly available from INTERNATIONAL BUSINESS MACHINES CORPORATION.

In one implementation, the connections between the least latency path delivery system 102, the network route parser system 104, the network controller 106, the network performance management system 108, and the core network 110 includes wired connections such as cables. For example, the components 102-110 communicate over the wired connections using a known protocol, such as the Transmission Control Protocol (TCP), the User Datagram Protocol (UDP), and the Internet Protocol (IP). In another implementation, the connections between the components 102-110 include includes wireless connections employing known wireless communication protocols such as Wi-Fi. In a further implementation, the connections between the components 102-110 include heterogeneous or hybrid combinations of wired and wireless connections.

The core network 110 includes various network components such as routers, gateways, switches, repeaters, bridges, hubs, and access points, protocol converters, servers, firewalls, network address translators, communication infrastructure devices, and other known devices, systems, and subsystems for interconnecting devices. In one implementation, the core network 110 enables communications into, out from, and within an organization.

In an implementation consistent with the invention, the least latency path delivery system 102 is also operatively connected to at least one user device 112 associated with at least one user 114. For example, the at least one user device 112 is an input device, an output device, or an input/output device configured to receive inputs from the at least one user 114 or to output information to the at least one user 114. In one implementation, the at least one user device 112 is configured to receive subscription information 116 and other communications 118 from the at least one user 114. In an implementation, the at least one user device 112 is a computing device such as a personal computer, a laptop, a tablet, a telephone, a smartphone, or any other known devices allowing the at least one user 114 to interface with and access the core network 110 through the least latency path delivery system 102. For example, the at least one user device 112 is operatively connected to the least latency path delivery system 102 using wired or wireless connections as described above.

In an implementation consistent with the invention, the least latency path delivery system 102 includes a hardware-based processor 120, a memory 122 configured to store instructions and configured to provide the instructions to the hardware-based processor 120, a communication interface 124, an input/output device 126, and a set of modules 128-134 configured to implement the instructions provided to the hardware-based processor 120. The set of modules 128-134 includes a subscription module 128, a service request module 130, a connection admission control (CAC) module 132, and a process train module 134. The subscription module 128 receives and processes the subscription information 116 from a respective user 114, and stores the subscription information 116 in the memory 122. In one implementation, the least latency path delivery system 102 and the set of modules 128-134 including the subscription module 128, the service request module 130, the connection admission control (CAC) module 132, and the process train module 134 include code in the PYTHON programming language, and the processor 120 executes the code. In another implementation, the least latency path delivery system 102 and the set of modules 128-134 include code in any known programming language, and the processor 120 executes the code.

The service request module 130 provides a subscriber-facing graphic user interface (GUI) to the user device 112 that front ends a subscription enablement process to prompt the user 114 to input the subscription information 116. In an implementation, the subscription information 116 includes a subscription request to steer the flow of the communications 118 of the user 114 over the least latency path determined by the least latency path delivery system 102, as described below. Through the GUI of the user device 112, the user 114, as a subscriber, provides flow details such as source and destination host IP addresses and optionally associated ports along with a projected bandwidth of the flow is expected to bring onto the core network 110. Once the user 114 has subscribed through the subscription enablement process by submitting the subscription information 116, the service request module 130 automatically initiates connection admission control by the CAC module 132 as described below. In addition, once the user 114 is subscribed, the service request module 130 automatically initiates an automated process train procedure using the process train module 134, as described below. In an implementation, the process train module 134 uses the JIRA application publicly available from ATLASSIAN CORPORATION for bug tracking, issue tracking, and agile project management.

Figure 2:
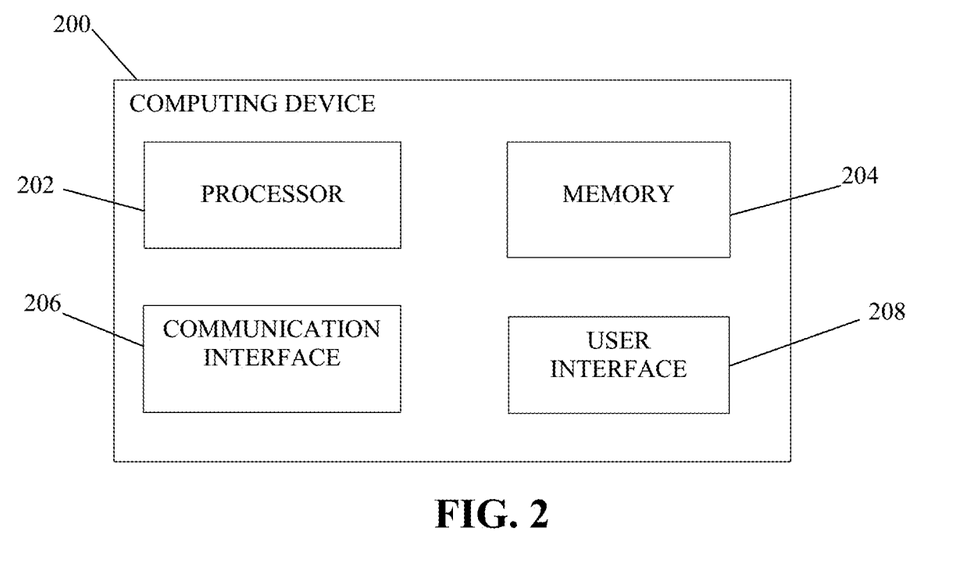
FIG. 2 is a schematic of a computing device used in the implementation.

FIG. 2 illustrates a schematic of a computing device 200 including a processor 202 having code therein, a memory 204, and a communication interface 206. Optionally, the computing device 200 can include a user interface 208, such as an input device, an output device, or an input/output device. The processor 202, the memory 204, the communication interface 206, and the user interface 208 are operatively connected to each other via any known connections, such as a system bus, a network, etc. Any component, combination of components, and modules of the system 100 in FIG. 1 can be implemented by a respective computing device 200. For example, each of the components 102-112 and 120-134 shown in FIG. 1 can be implemented by a respective computing device 200 shown in FIG. 2 and described below.

It is to be understood that the computing device 200 can include different components. Alternatively, the computing device 200 can include additional components. In another alternative implementation, some or all of the functions of a given component can instead be carried out by one or more different components. The computing device 200 can be implemented by a virtual computing device. Alternatively, the computing device 200 can be implemented by one or more computing resources in a cloud computing environment. Additionally, the computing device 200 can be implemented by a plurality of any known computing devices.

The processor 202 can be a hardware-based processor implementing a system, a sub-system, or a module. The processor 202 can include one or more general-purpose processors. Alternatively, the processor 202 can include one or more special-purpose processors. The processor 202 can be integrated in whole or in part with the memory 204, the communication interface 206, and the user interface 208. In another alternative implementation, the processor 202 can be implemented by any known hardware-based processing device such as a controller, an integrated circuit, a microchip, a central processing unit (CPU), a microprocessor, a system on a chip (SoC), a field-programmable gate array (FPGA), or an application-specific integrated circuit (ASIC). In addition, the processor 202 can include a plurality of processing elements configured to perform parallel processing. In a further alternative implementation, the processor 202 can include a plurality of nodes or artificial neurons configured as an artificial neural network. The processor 202 can be configured to implement any known machine learning (ML) based devices, any known artificial intelligence (AI) based devices, and any known artificial neural networks, including a convolutional neural network (CNN).

The memory 204 can be implemented as a non-transitory computer-readable storage medium such as a hard drive, a solid-state drive, an erasable programmable read-only memory (EPROM), a universal serial bus (USB) storage device, a floppy disk, a compact disc read-only memory (CD-ROM) disk, a digital versatile disc (DVD), cloud-based storage, or any known non-volatile storage.

The code of the processor 202 can be stored in a memory internal to the processor 202. The code can be instructions implemented in hardware. Alternatively, the code can be instructions implemented in software. The instructions can be machine-language instructions executable by the processor 202 to cause the computing device 200 to perform the functions of the computing device 200 described herein. Alternatively, the instructions can include script instructions executable by a script interpreter configured to cause the processor 202 and computing device 200 to execute the instructions specified in the script instructions. In another alternative implementation, the instructions are executable by the processor 202 to cause the computing device 200 to execute an artificial neural network. The processor 202 can be implemented using hardware or software, such as the code. The processor 202 can implement a system, a subsystem, or a module, as described herein.

The memory 204 can store data in any known format, such as databases, data structures, data lakes, or network parameters of a neural network. The data can be stored in a table, a flat file, data in a filesystem, a heap file, a B+ tree, a hash table, or a hash bucket. The memory 204 can be implemented by any known memory, including random access memory (RAM), cache memory, register memory, or any other known memory device configured to store instructions or data for rapid access by the processor 202, including storage of instructions during execution.

The communication interface 206 can be any known device configured to perform the communication interface functions of the computing device 200 described herein. The communication interface 206 can implement wired communication between the computing device 200 and another entity. Alternatively, the communication interface 206 can implement wireless communication between the computing device 200 and another entity. The communication interface 206 can be implemented by an Ethernet, Wi-Fi, Bluetooth, or USB interface. The communication interface 206 can transmit and receive data over a network and to other devices using any known communication link or communication protocol.

The user interface 208 can be any known device configured to perform user input and output functions. The user interface 208 can be configured to receive an input from a user. Alternatively, the user interface 208 can be configured to output information to the user. The user interface 208 can be a computer monitor, a television, a loudspeaker, a computer speaker, or any other known device operatively connected to the computing device 200 and configured to output information to the user. A user input can be received through the user interface 208 implementing a keyboard, a mouse, or any other known device operatively connected to the computing device 200 to input information from the user. Alternatively, the user interface 208 can be implemented by any known touchscreen. The computing device 200 can include a server, a personal computer, a laptop, a smartphone, or a tablet.

Figure 3:
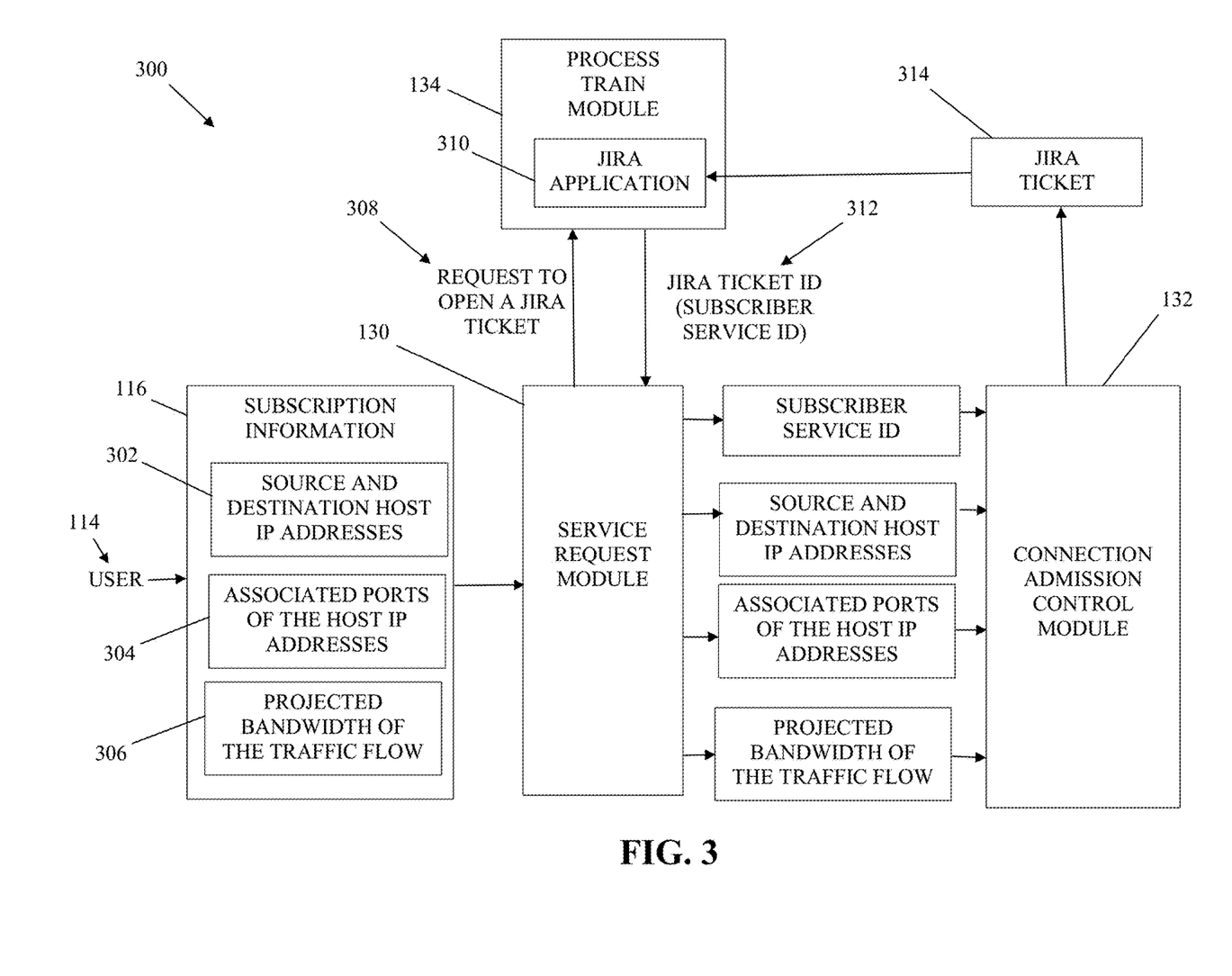
FIG. 3 is a flow diagram of operation of components of the system of FIG. 1.

Referring to FIG. 3, a flow diagram 300 illustrates the processing of the subscription information 116 by the service request module 130. As described above, the subscription information 116 includes source and destination host IP addresses 302, associated ports of the host IP addresses 304, and projected bandwidth of the traffic flow 306, which are sent to the service request module 130. In response to receiving such information 302-306, the service request module 130 generates a request 308 to open a JIRA ticket.

The service request module 130 transmits the request 308 to the process train module 134 operating a JIRA application 310. In response to the request 308, the JIRA application 310 generates a JIRA ticket identification (ID) 312 which is used as a subscriber service ID. The system 100 associates the subscriber service ID with the traffic flow for any subsequent reference, and is even referenced in the configuration that is later pushed onto the routers of the core network 110. The JIRA ticket ID 312 is sent to the service request module 130. In turn, the service request module 130 transmits the JIRA ticket ID 312, as the subscriber service ID, to the CAC module 132. The service request module 130 also transmits the source and destination host IP addresses 302, associated ports of the host IP addresses 304, and projected bandwidth of the traffic flow 306 to the CAC module 132.

In response to receiving the information 302-306, 312, the CAC module 132 is triggered to implement automation to collect all the information needed to steer the subscribed flow on to the least latency path available through the core network 110. In addition, the CAC module 132 is triggered to identify whether there are going to be any capacity issues due to the projected bandwidth subscriber flow being brought onto the core network 110. In one implementation, once the CAC module 132 is triggered, the CAC module 132 automatically generates the following information (a)-(e), and generates a JIRA ticket including such information (a)-(e), as follows: (a) information identifying the routers flow enters and exits in both directions from the core infrastructure of the core network 110, which are called a head end provider edge (PE) and a tail end PE, respectively; (b) information identifying a least latency path which the traffic flow will take between the head end and tail end PEs; (c) information calculated from determining at a historical bandwidth usage which interfaces that the path takes, and whether adding the projected bandwidth of the subscriber flow will breach a bandwidth usage threshold that will kick off capacity management procedures, and if any such situation is identified, the situation is flagged for human consideration, with the historical bandwidth usage being a time period configurable by a system administrator inputting the time period using the input/output device 126, and the usage threshold is configurable by a system administrator inputting the usage threshold using the input/output device 126; (d) information identifying interfaces through which the traffic flow can enter the core network 110 and exits the core network 110; and (e) information including a command as a uniform resource locator (URL) link which the CAC module 132 automatically creates which, when actuated such as by clicking, executes an ANSIBLE-based playbook, publicly available from RED HAT, INC., that will push policies onto the core network 110 to steer the traffic flow of the communications 118 of the user 114 on the least latency path. In one implementation, such automatic creation of the URL is a restricted operation and require the JIRA ticket 312 to be in a specific state to execute.

In an implementation, the information (d) automatically generated by the CAC module 132 further includes (1) information identifying which network segmentation, using a virtual routing function, which the traffic flow will be transported on the core network 110; (2) information identifying IP addresses on the identified access interfaces; (3) information identifying the name of the remote router which the traffic flow will pass to get to the core network 110; (4) information identifying whether the traffic flow is to a branch, and so identifying a latency on the access link to the remote router; (5) information identifying which network segmentation, using a virtual router function, that the traffic flow will be treated on the branch router; and (6) information for a configuration for the branch routers automatically developed based on the branch information already known, with such identifying information implemented on the branch routers to steer traffic over the least latency link already identified by CAC module 132.

The CAC module 132 generates a JIRA-based ticket 314 shown in FIG. 3, with the JIRA-based ticket 314 associated with the subscription of the user 114. In one implementation, an example ticket 400 shown in FIG. 4 is created by the CAC module 132 as the ticket 314. The CAC module 132 then incorporates the information (a)-(e) automatically generated by the CAC module 132, as shown in the ticket 400 in FIG. 4. The CAC module 132 outputs the JIRA-based ticket 314 to the JIRA application 310 of the process train module 134, as shown in FIG. 3.

The operation of the CAC module 132 to automatically generate the information (a)-(e) described above involves CAC module 132 making an application programming interface (API) call to the network route parser system 104. The API call involves transmitting a flow source IP entry point lookup request and a flow destination IP entry point lookup request to the network route parser system 104. In response to the API call with the entry point lookup requests, the network route parser system 104 is configured to perform a lookup operation into a routing table of the core network 110. In an implementation, the routing table is stored in a memory of the network route parser system 104. In addition to the lookup operation, the network route parser system 104 interfaces with an IP dump. In an implementation, the IP dump is stored in the memory 122.

The lookup operation identifies an edge router in the core infrastructure of the core network 110. The identified edge router is learned by the CAC module 132 for the source and destination prefixes of the user device 114 of the subscribing user. The CAC module 132 identifies the routers into which the subscriber traffic flow can enter the core network 110 and from which the subscriber traffic flow can leave the core network 110 in both directions of the flow. In an implementation, the CAC module 132 identifies the head end PE routers and tail end PE routers for the traffic flow in both directions.

The network route parser system 104 takes the input of traffic flow IP addresses provided by the subscriber from the CAC module 132, and parses route tables of all provider edge devices for identified virtual routing and forwarding (VRF) in a VRF space. The network route parser system 104 then looks for the presence of subscribed traffic flow IP addresses, and identifies a next hop IP in each VRF space. The network route parser system 104 takes the identified next hop IP, and queries internal tools of the network route parser system 104 to identify the name of the next hop. The network route parser system 104 then identifies a VRF space of a core router where a branch router is present, identifies a data center router facing router, or a data center router as a next hop. The identified router is an edge router for which the subscribed traffic flow IP is entering the core network 110. In one implementation, the network route parser system 104 then obtains network route parser information including at least one of: the name of an edge router of the core network 110, a next hop along with the associated next hop IP, an interface of the core router, an interface of the next hop router, and the VRF space. The network route parser system 104 forwards, transmits, conveys, or otherwise provides such obtained network route parser information to the CAC module 132. In another implementation, the network route parser information includes at least: identification of an interface entry point of a prefix, a tunnel head end PE, and a tunnel tail end PE.

With such network route parser information obtained from the network route parser system 104, the CAC module 132 then knows which traffic flows of routers are entering and leaving the core network 110. The CAC module 132 then makes an API call to the network controller 106, such as the CROSSWORKS optimization engine publicly available from CISCO SYSTEMS, INC., to identify a least latency path between the head end and the tail end. In an implementation, the CAC module 132 transmits the identification of an interface entry point of a prefix, a tunnel head end PE, and a tunnel tail end PE to the network controller 106. The network controller 106 stores information of the full topology of the core network 110 as well as a traffic engineered paths database. For example, the network controller 106 stores such full topology in a local memory of the network controller 106.

With such full topology and traffic engineered paths information, the network controller 106 transmits to the CAC module 132 a full least latency path including hops and interfaces which the traffic flow is to traverse across the core network 110 between the head end and tail end PE pairs. In an implementation, the full least latency path is a latency optimized tunnel path through the core network 110.

The CAC module 132 transmits the full least latency path and a projected traffic flow bandwidth to the network performance management system 108. In response, the network performance management system 108 looks up historical data for hops and interfaces on the least latency path which is stored in a historical database maintained in a memory of the network performance management system 108. The network performance management system 108 performs the lookup of historical data for a specified time span. The specified time span is configurable by a system administrator inputting the time span using the input/output device 126. In an implementation, the network performance management system 108 searches the historical database for historical data representing a 95 percentile of peak utilization for each day in the specified time span representing a historical maximum bandwidth utilization on the least latency path. The network performance management system 108 then gathers the historical data as historical information to be forwarded, transmitted, conveyed, or otherwise provided to the CAC module 132.

Using the gathered historical information, the CAC module 132 then adds the projected bandwidth to the bandwidth of the historical maximum bandwidth utilization on the least latency path, and determines if the summation of bandwidths is greater than a capacity threshold value. The capacity threshold is configurable by a system administrator inputting the capacity threshold using the input/output device 126. If the summation of bandwidths surpasses the capacity threshold, the CAC system 132 generates a flag, an alert, or a notification associated with the projected traffic flow bandwidth corresponding to the least latency path. In an implementation, the CAC module 132 outputs the flag, the alert, or the notification through the input/output device 126. In another implementation, the CAC system 132 outputs the flag, the alert, or the notification to a system administrator or engineering team through the input/output device 126.

The CAC module 132 identifies a corresponding plane router in the core network 110 for the entry and exit router. Such information of the plane router is static, and is stored in a memory for lookup. In one implementation, the information of the plane router is stored in a local memory of the CAC module 132. In another implementation, the information of the plane router is stored in the memory 122. The CAC module 132 operates with the network controller 106 and the network performance management system 108 for full mesh combinations between a pair of entry routers and exiting routes, such as head ends and tail ends, respectively. The CAC module 132 operates with the network controller 106 and the network performance management system 108 reverses the head end and tail end combination for the reverse path as well.

In an implementation, the CAC module 132 checks out the latency on the core network 110 to a branch router by looking up Internet Protocol Service Level Agreement (IP-SLA) data on an edge to branch router using the network performance management system 108. In an implementation, the CAC module 132 transmits tunnel head end PE interface entry point of prefix information to the network performance management system 108. The network performance management system 108 identifies the latency on the access link between an edge router and the connected branch router, and also identifies what branch side VRF space to which the branch interface belongs. In an implementation, the network performance management system 108 transmits to the CAC module 132 information of the branch router PE interface to branch router latency over the interface to the branch router.

The CAC module 132 then updates the JIRA ticket 314 shown in FIG. 3 with all of the information gathered as described above. The gathered information includes (a) information about a full mesh least latency path in traffic flows in a forward direction, including a date and any interface traffic utilization flag that is generated, as well as information about a full mesh least latency path in traffic flows in a reverse direction, including a date and any interface traffic utilization flag that is generated; (b) all access side information including for a core side router, core network side VRF space, and information related to the core network side and connected branch/datacenter/data center facing router name, as well as core network side and branch/datacenter/data center facing router interface, IP addresses on both side and latency on the link and the VRF space to which the IP address belongs on the branch side; (c) information available on the access point, that is, the branch router connected to the core network edge router, which the branch router develops a syntax of a branch side configuration to steer traffic flow on the least latency access link from branch to core network routers identified from information collected from the network performance management system 108 and included in the JIRA ticket 314 in FIG. 3; and (d) a URL link to the ANSIBLE playbook stored on the network controller 106 which, when actuated, such as by clicking, with appropriate ticket status, can trigger an API call to execute the playbook to deploy a traffic flow steering configuration on the core side interfaces. The URL link steers traffic flow belonging to the subscribed source and destination IP and port to be steered on to the least latency path to the destination next hop.

Referring to FIGS. 1 and 3, when a user 114 subscribes to the least latency path delivery system 102 using the subscription module 128, the service request module 130 starts a JIRA-based process train which automates an established network subscriber service enablement process to access the core network 110 with the least latency of traffic flow of the communications 118 to and from the user 114 operating the user device 112.

As described above in connection with FIG. 3, when the user 114 subscribes and provides information to the service request module 130, the service request module 130 invokes the process train module 134 operating a JIRA application 310, and JIRA ticket is opened up having a JIRA ticket ID 312. In an implementation, the ticket ID 312 is a number. The JIRA ticket ID 312 becomes the service ID for the subscription associated with the user 114. All further reference to the user subscription is made through the JIRA Ticket ID 312, which is the service ID. The process train module 134 initiates a process train that provides human validation of the information as the information moves through an organizational network change process. A status of a service ticket such as the JIRA ticket 314 depicts the validation process stages. Once a validation process is completed, the CAC module 132 generates a command on the service ticket, such as the JIRA ticket 314 shown in FIG. 3. The command on the service ticket is executed, and the requested traffic is then steered over the least latency path. The CAC module 132 then automatically initiates the information gathering operations described above, which is then incorporated into the JIRA ticket 314.

In one implementation, the process train module 134, responsive to the request 308, is triggered to prompt the CAC module 132 to generate the service ticket/JIRA ticket 314, to associate the service ticket/JIRA ticket 314 with the service ID 312, and to automatically map an organizational network change process to generate an organizational network change process map, wherein the CAC module 132 automatically furnishes required information that is needed to steer the traffic on the least latency path. The required information includes the command having a uniform resource locator (URL) link. The command is not executable until the service ticket reaches a predetermined appropriate level of validation status. As the process train module 134 operates in accordance with the organizational network change process map, the process train module 134 automatically sends a notification to a team member, through the input/output device 126, requesting a validation of the information in the service ticket. The team member provides human review and input into the validation process. The process train module 134, responsive to receiving the validation from the team member through the input/output device 126, generates status information associated with the status of the service ticket, with the status information depicting a validation process stage.

In addition, the JIRA application initiates an automatic email notification to an engineering team with JIRA status set to "Pending Engineering Review". In an implementation, the email notification is transmitted to the engineering team through the input/output device 126. Once the engineering team receives the email notification, the engineering team reviews the CAC output in the JIRA ticket 314. In one implementation, using commands input by the engineering team to the least latency path delivery system 102 through the input/output device 126, the CAC module 132 repeats execution of the information gathering. In another implementation, the service request module 130 is configured to receive commands input by the engineering team to have CAC module 132 repeat execution of the information gathering. The CAC module 132 automatically outputs the gathered information by updating and publishing the JIRA ticket 314. If the engineering team agrees that the subscription of the user 114 can go forward, the engineering team can change the status of the JIRA ticket 312 to "Pending Operations Review" using the input/output device 126.

Once the JIRA ticket 312 is placed in "Pending Operations Review" status, an automatic email is generated by the process train module 134 and output through the input/ output device 126 to notify an operations team. After reviewing the output, the operations team can create a change management ticket, and change the status of the JIRA ticket 312 to "Change Pending Approval". The operations team also identifies a change management window for implementing changes on the core network 110.

In a maintenance window identified for change management execution, a status of the ticket is changed to "Ops L3 Execution". This is the required status for the URL in the JIRA ticket 31 to become active. The operations team then actuates the URL such as by clicking the URL to initiate a CROSSWORKS playbook which is automatically provided for all required payloads. The CROSSWORKS playbook implements a policy-based tunnel steering configuration on the routers to steer the subscribed traffic flow on to the least latency path available. The operations team needs to provide security credentials. In an implementation, the security credentials include a UserID and password.

A backend CROSSWORKS system implements a configuration on the routers using an operations team user credentials, which ensures trackability of the changes that are being made on the core network 110, and also configurations pushed on a router have a service ID description associated with the JIRA ticket ID 312 to tie the configuration to the subscription request of the user 114. Once the subscription is automatically implemented successfully on the core network 110 after verification, the operations team changes the status of the JIRA ticket 312 to "Closed". The closed status culminates the service subscription process train for the requested service.

During processing of the JIRA ticket 314, such processing can be canceled and the subscription request of the user 114 can be rejected if an engineering team or an operations team decides to rejection the subscription request based upon the needs and capacity of the core network 110. The JIRA ticket status is then changed to "Canceled". The subscription cancelation option is available to the user through the service request module 130, which can ask for the JIRA ID 312, as the service ID of the service being canceled. Once the cancelation option is selected, and subsequently the service ID is associated with a Cancel Subscription Identification applied to the JIRA ticket 314. The internal status of the JIRA ticket 314 changes from "Closed" to "Pending Engineering". A URL is added to the JIRA ticket 314 for cancellation of the subscription. Actuating the URL such as by clicking the URL initiates a playbook procedure to remove subscription configuration of the user 114 from the routers of the core network 110. As in the case of the subscription process, the URL link is only active when the status of the JIRA ticket 314 goes to OPS Execution which comes later in the process train.

An engineering team is automatically notified via an email with "Cancel Subscription" identification. Once the review by an engineering team is complete, the status of the JIRA ticket 312 is changed to "Pending Operations" when the engineering team uses a cancel subscription procedure to update the status of the JIRA ticket 312. The process train module 134 then automatically generates an email notification to an operations team.

The operations team goes through the change management process as the ticket status is changed to "Change Pending Approval" by selecting a cancel subscription status update. Once the change management process is complete, the JIRA ticket 314 is changed to "L3 Operations Execution" by an operations team at the time of a change management maintenance window. The change in the JIRA ticket 314 occurs using cancel subscription status update as well. The only difference in the process run is that, during all manual stages, the status update is made using cancel subscription selection in the status update. However, ticket status remains the same. To achieve the desired status, an operations team always selects cancel subscription at all manual stages.

When the ticket status is "L3 Operations Execution", the process train module 134 unlocks the restriction on the URL link. Once the URL link is actuated, such as by clicking, the process train module 134 asks the user 114 for user credentials, and subsequently an automatically remove subscription playbook is initiated with all of the required payload per the service ID. Playbook execution removes a subscription-related configuration from the routers. Once the subscription cancelation is successfully verified by an operations team, the operations team sets the JIRA ticket 314 to "Canceled" status.

Figure 5A:
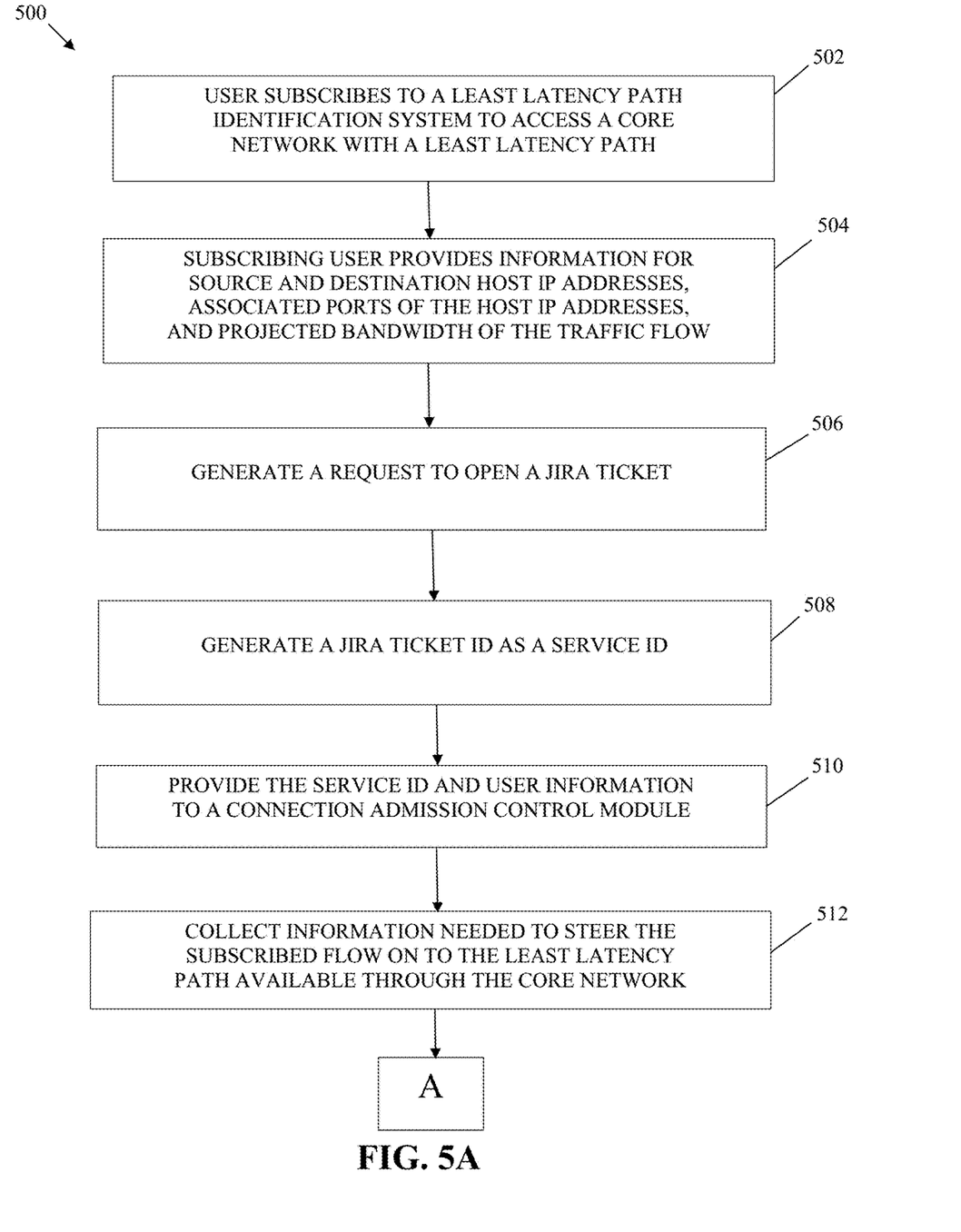
FIGS. 5A-5B are flowcharts of operation of the system of FIG. 1.
Figure 5B:
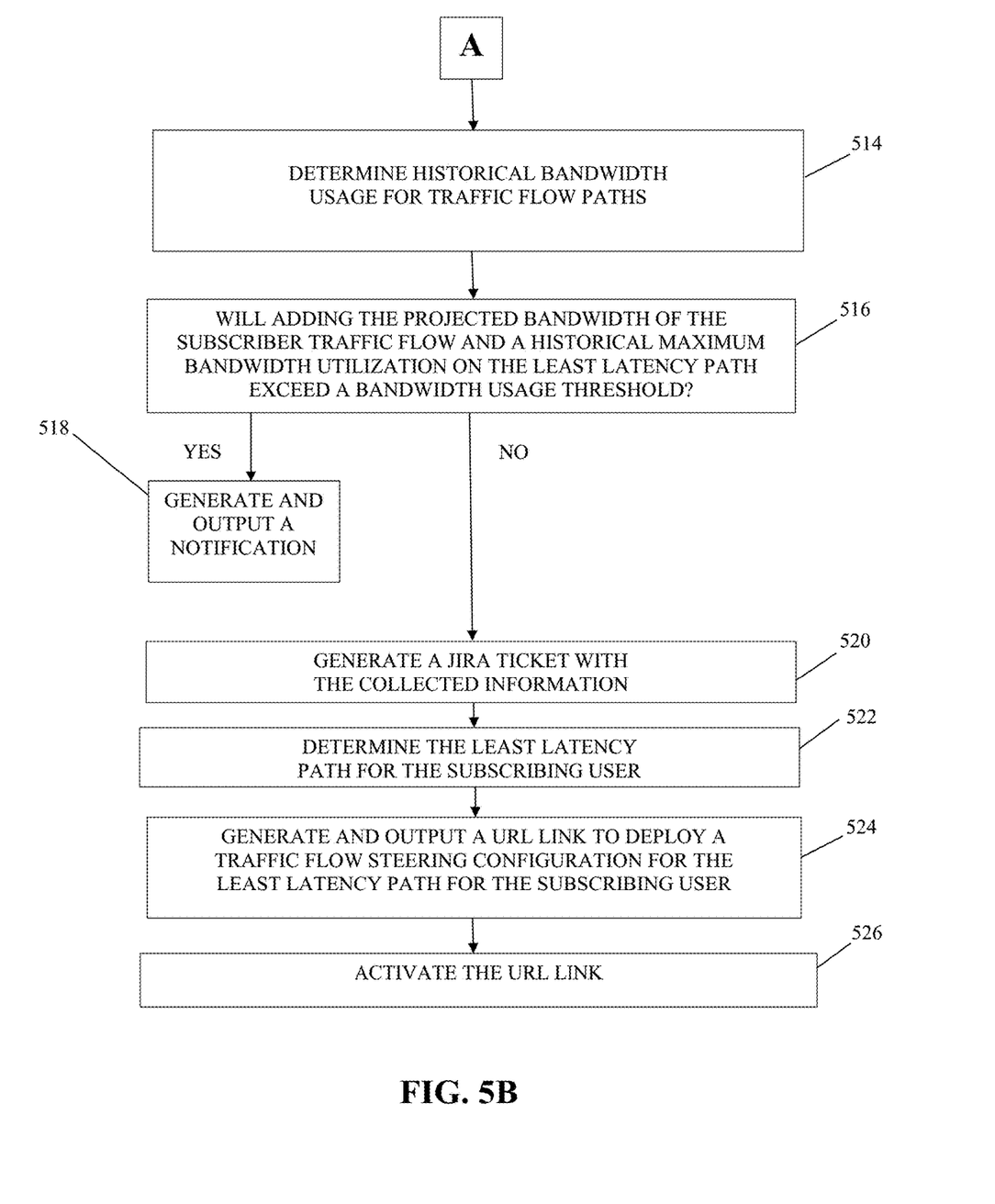

Referring to FIGS. 5A-5B, a computer-based method 500 includes subscribing a user to a least latency path delivery system 102 to access a core network 110 with a least latency path in step 502; providing information by the subscribing user with traffic parameters as information including source and destination host IP addresses, associated ports of the host IP addresses, and projected bandwidth of the traffic flow in step 504; generating a request to open a JIRA ticket in step 506; generating a JIRA ticket ID 312 as a service ID in step 508; providing the service ID and user information to a connection admission control module 132 in step 510; collecting information needed to steer the subscribed flow on to the least latency path available through the core network in step 512; determining historical bandwidth usage for traffic flow paths in step 514; and determining whether adding the projected bandwidth of the subscriber traffic flow and a historical maximum bandwidth utilization on the least latency path exceeds a predetermined bandwidth usage threshold in step 516. In the case that adding the projected bandwidth and the historical maximum bandwidth utilization on the least latency path exceeds the predetermined bandwidth usage threshold, generating and outputting a notification in step 518. However, in the case that adding the projected bandwidth and the historical maximum bandwidth utilization on the least latency path does not exceed the predetermined bandwidth usage threshold, generating a JIRA ticket 314 with the collected information in step 520. The method 500 then determines the least latency path for the subscribing user in step 522, generates and outputs a URL link to deploy a traffic flow steering configuration for the least latency path for the subscribing user in step 524, and activates the URL link in step 526.

In an implementation consistent with the invention, a non-transitory computer-readable storage medium stores instructions executable by a processor, such as the processor 120, to perform automated steering of network traffic over a least latency path. The instructions include the steps 502-526 of FIGS. 5A-5B.

Using the system 100 and method 500, automation of the traffic steering over the identified least latency path is performed which enables low latency transport services of the communications 118 over a routed core infrastructure of the core network 110 for subscribers to the core network 110. Such automation of the traffic steering over the identified least latency path combines the use of intelligent integrated process automation with router feature sets of network controllers 106, such as network controllers publicly available from CISCO SYSTEMS, INC. that steers the traffic over the identified least latency path across the network 110 upon subscription. Such a combination of process automation and router features sets unburdens engineering and operations teams administering the core network 110 from under the hood complexity and considerations that are required to steer traffic from point A to point Z within the core transport infrastructure of the core network 110 while maintaining organizational policies and procedures, as well as due diligence needed in making a change in the core network 110. A look into historical records of peak utilization provides better data points to predict issues with bandwidth consumption when the peak happens with the subscribed flow traversing on the path.

Portions of the methods described herein can be performed by software or firmware in machine readable form on a tangible or non-transitory storage medium. For example, the software or firmware can be in the form of a computer program including computer program code adapted to cause the system to perform various actions described herein when the program is run on a computer or suitable hardware device, and where the computer program can be implemented on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously.

It is to be further understood that like or similar numerals in the drawings represent like or similar elements through the several figures, and that not all components or steps described and illustrated with reference to the figures are required for all embodiments, implementations, or arrangements.

The terminology used herein is for the purpose of describing particular implementations only and is not intended to be limiting of the invention. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

While the disclosure has described several exemplary implementations, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to implementations of the disclosure without departing from the essential scope thereof. Therefore, it is intended that the invention not be limited to the particular implementations disclosed, or to the best mode contemplated for carrying out this invention, but that the invention will include all implementations falling within the scope of the appended claims.

The subject matter described above is provided by way of illustration only and should not be construed as limiting. Various modifications and changes can be made to the subject matter described herein without following the example embodiments, implementations, and applications illustrated and described, and without departing from the true spirit and scope of the invention encompassed by the present disclosure, which is defined by the set of recitations in the following claims and by structures and functions or steps which are equivalent to these recitations.

What is claimed is:

1. A least latency path delivery system configured to identify a least latency path of traffic flow in a network, comprising:
   an input/output device;
   a hardware-based processor;
   a memory configured to store instructions and configured to provide the instructions to the hardware-based processor; and
   a set of modules configured to implement the instructions provided to the hardware-based processor, the set of modules including:
     a service request module configured to receive traffic parameters from a user;
     a process train module configured to generate a service identification (ID) in response to a request from the service request module; and
     a connection admission control (CAC) module configured to generate a service ticket including the service ID and the traffic parameters, to communicate with a network controller operatively connected to the network to gather path information about the least latency path through the network, to determine the least latency path from the gathered path information, and to generate a command in the service ticket,
   wherein the process train module, responsive to the request, is triggered to prompt the CAC module to generate a service ticket, to associate the service ticket with the service ID, and to automatically map an organizational network change process to generate an organizational network change process map,
   wherein the CAC module automatically furnishes required information that is needed to steer the traffic on the least latency path,
   wherein the required information includes the command having a uniform resource locator (URL) link,
   wherein the command is not executable until the service ticket reaches a predetermined appropriate level of validation status,
   wherein, as the process train module operates in accordance with the organizational network change process map, the process train module automatically sends a notification to a team member, through the input/output device, requesting a validation of the information in the service ticket,
   wherein the process train module, responsive to receiving the validation from the team member through the input/output device, generates status information associated with the status of the service ticket, with the status information depicting a validation process stage, and wherein activation of the command configures the network to steer the traffic flow of communications of the user on the least latency path.

2. The least latency path delivery system of claim 1, wherein the traffic parameters are selected from the group consisting of: a source host Internet Protocol (IP) address, a destination host IP address, a first port associated with the source host IP address, a second port associated with the destination host IP address, and projected bandwidth of the traffic flow.

3. The least latency path delivery system of claim 2, wherein the CAC module determines whether a sum of the projected bandwidth and a historical maximum bandwidth utilization on the least latency path is greater than a predetermined bandwidth usage threshold.

4. The least latency path delivery system of claim 3, further comprising:
an output device,
wherein, in the case that the sum of the projected bandwidth and the historical maximum bandwidth utilization on the least latency path is greater than the predetermined bandwidth usage threshold, the CAC module generates and outputs, through the output device, a notification of the predetermined bandwidth usage threshold being exceeded.

5. The least latency path delivery system of claim 3, wherein, in the case that the sum of the projected bandwidth and the historical maximum bandwidth utilization on the least latency path is not greater than the predetermined bandwidth usage threshold, the CAC module determines the least latency path from the gathered path information, and generates the command.

6. The least latency path delivery system of claim 1, wherein the CAC module communicates with a network route parser system operatively connected to the network to gather network route parser information about the network, and to determine the least latency path from the gathered network route parser information.

7. The least latency path delivery system of claim 6, wherein the CAC module communicates with a network performance management system operatively connected to the network to gather historical information about the network, and to determine the least latency path from the gathered historical information.

8. A system configured to identify a least latency path of traffic flow in a network, comprising:
a network controller operatively connected to the network;
a network route parser system operatively connected to the network;
a network performance management system operatively connected to the network; and
a least latency path delivery system including:
an input/output device;
a hardware-based processor;
a memory configured to store instructions and configured to provide the instructions to the hardware-based processor; and
a set of modules configured to implement the instructions provided to the hardware-based processor, the set of modules including:
a service request module configured to receive traffic parameters from a user;
a process train module configured to generate a service identification (ID) in response to a request from the service request module; and
a connection admission control (CAC) module configured to generate a service ticket including the service ID and the traffic parameters, to communicate with the network controller, the network route parser system, and the network performance management system to gather information about the network, to determine the least latency path from the gathered information, and to generate a command in the service ticket, wherein the process train module, responsive to the request, is triggered to prompt the CAC module to generate a service ticket, to associate the service ticket with the service ID, and to automatically map an organizational network change process to generate an organizational network change process map, wherein the CAC module automatically furnishes required information that is needed to steer the traffic on the least latency path, wherein the required information includes the command having a uniform resource locator (URL) link, wherein the command is not executable until the service ticket reaches a predetermined appropriate level of validation status, wherein, as the process train module operates in accordance with the organizational network change process map, the process train module automatically sends a notification to a team member, through the input/output device, requesting a validation of the information in the service ticket, wherein the process train module, responsive to receiving the validation from the team member through the input/output device, generates status information associated with the status of the service ticket, with the status information depicting a validation process stage, and wherein activation of the command configures the network to steer the traffic flow of communications of the user on the least latency path.

9. The system of claim 8, wherein the traffic parameters are selected from the group consisting of: a source host Internet Protocol (IP) address, a destination host IP address, a first port associated with the source host IP address or a second port associated with the destination host IP address, and projected bandwidth of the traffic flow.

10. The system of claim 9, wherein the CAC module determines whether a sum of the projected bandwidth and a historical maximum bandwidth utilization on the least latency path is greater than a predetermined bandwidth usage threshold.

11. The system of claim 10, further comprising:
an output device,
wherein, in the case that the sum of the projected bandwidth and the historical maximum bandwidth utilization on the least latency path is greater than the predetermined bandwidth usage threshold, the CAC module generates and outputs, through the output device, a notification of the predetermined bandwidth usage threshold being exceeded.

12. The system of claim 10, wherein, in the case that the sum of the projected bandwidth and the historical maximum bandwidth utilization on the least latency path is not greater than the predetermined bandwidth usage threshold, the CAC module determines the least latency path from the gathered path information, and generates the command.

13. The system of claim 8, wherein the command is a uniform resource locator (URL) link.

14. A computer-based method, comprising:
providing an input/output device, a hardware-based processor, a memory configured to store instructions and configured to provide the instructions to the hardware-based processor, and
a set of modules configured to implement the instructions provided to the hardware-based processor, the set of modules including a service request module, a process train module, and a connection admission control (CAC) module;
receiving traffic parameters from a user to access a network;
sending a request from the service request module to the process train module;
generating, by the process train module, a service identification (ID) in response to request;
transmitting the traffic parameters and the service ID to the CAC module;
generating a service ticket including the service ID and the traffic parameters;
communicating with a network controller operatively connected to the network;
gathering path information about a least latency path through the network from the network controller;
determining the least latency path of communications from the user through the network from the gathered path information;
generating a command in the service ticket; and
activating the command to configure the network to steer traffic flow of communications of the user on the least latency path,
wherein the process train module, responsive to the request, is triggered to prompt the CAC module to generate a service ticket, to associate the service ticket with the service ID, and to automatically map an organizational network change process to generate an organizational network change process map,
wherein the CAC module automatically furnishes required information that is needed to steer the traffic on the least latency path,
wherein the required information includes the command having a uniform resource locator (URL) link,
wherein the command is not executable until the service ticket reaches a predetermined appropriate level of validation status,
wherein, as the process train module operates in accordance with the organizational network change process map, the process train module automatically sends a notification to a team member, through the input/output device, requesting a validation of the information in the service ticket,
wherein the process train module, responsive to receiving the validation from the team member through the input/output device, generates status information associated with the status of the service ticket, with the status information depicting a validation process stage.

15. The method of claim 14, wherein the traffic parameters are selected from the group consisting of: a source host Internet Protocol (IP) address, a destination host IP address, a first port associated with the source host IP address, a second port associated with the destination host IP address, and projected bandwidth of the traffic flow.

16. The method of claim 15, further comprising:
determining whether a sum of the projected bandwidth and a historical maximum bandwidth utilization on the least latency path is greater than a predetermined bandwidth usage threshold.

17. The method of claim 16, wherein, in the case that the sum of the projected bandwidth and the historical maximum bandwidth utilization on the least latency path is greater than the predetermined bandwidth usage threshold, generating and outputting through an output device, a notification of the predetermined bandwidth usage threshold being exceeded, and
wherein, in the case that the sum of the projected bandwidth and the historical maximum bandwidth utilization on the least latency path is not greater than the predetermined bandwidth usage threshold, determining the least latency path from the gathered information, and generates the command.

18. The method of claim 14, wherein the command is a uniform resource locator (URL) link, and
wherein activating the command includes actuating the URL link.

19. The method of claim 14, further comprising:
gathering network route parser information about the network from a network route parser system; and
gathering historical information about the network from a network performance management system,
wherein determining the least latency path includes using the gathered network route parser information and the gathered historical information.

* * * * *